Dec. 26, 1967  J. H. REIDER  3,359,875
METHODS FOR LAYING SOIL CEMENT
Filed April 9, 1965  3 Sheets-Sheet 3
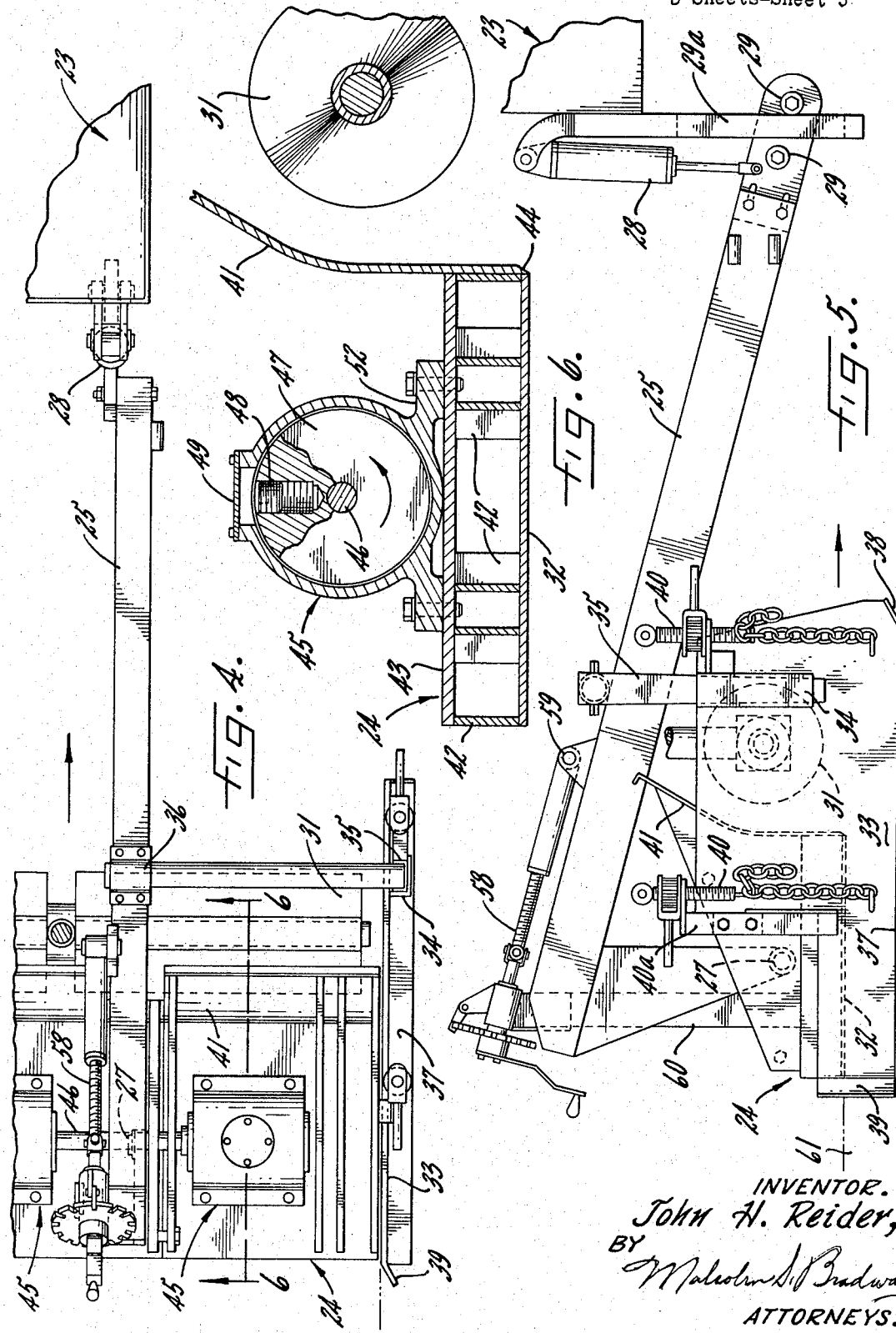
INVENTOR.
John H. Reider,
BY
Malcolm S. Bradway
ATTORNEYS.

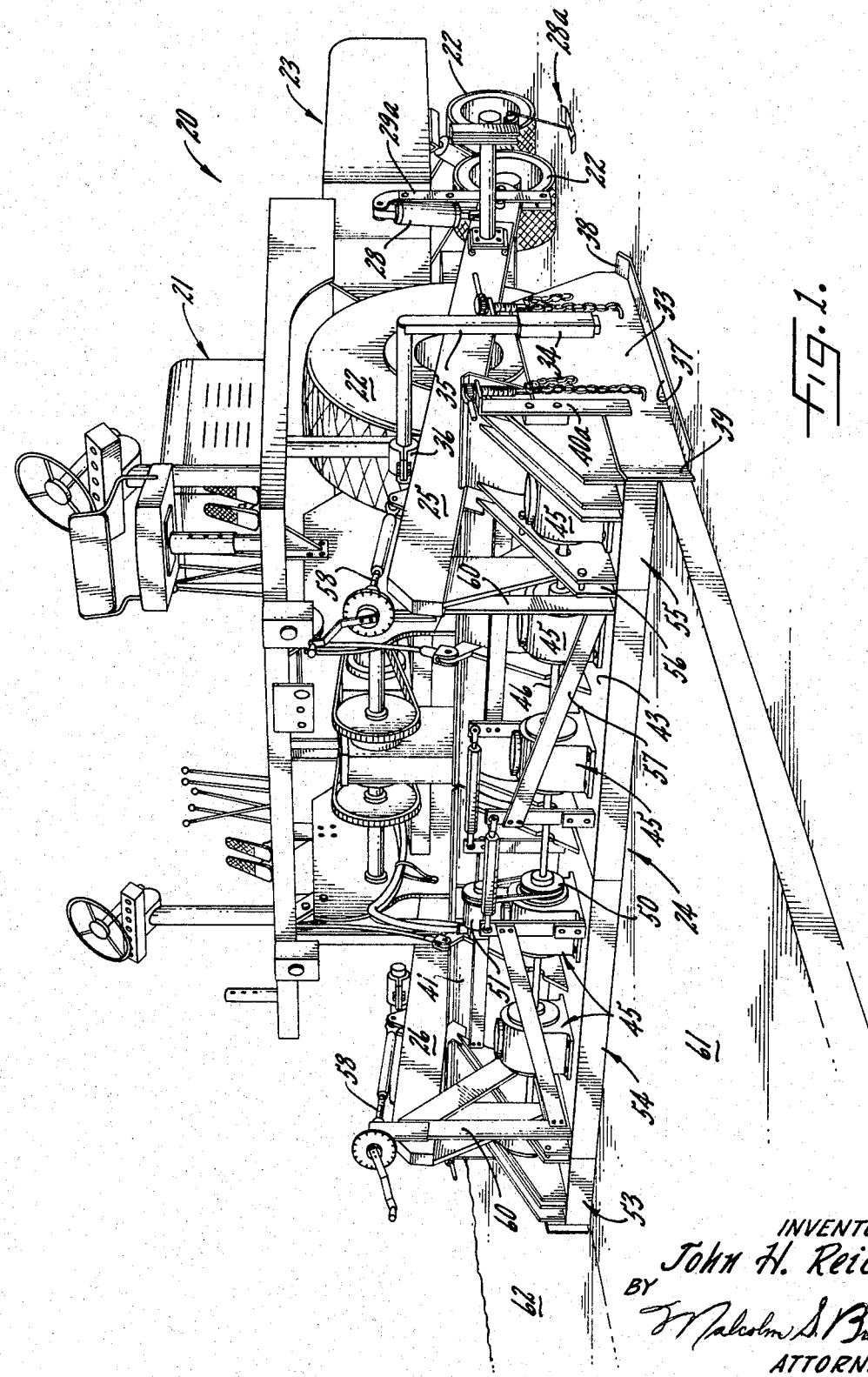

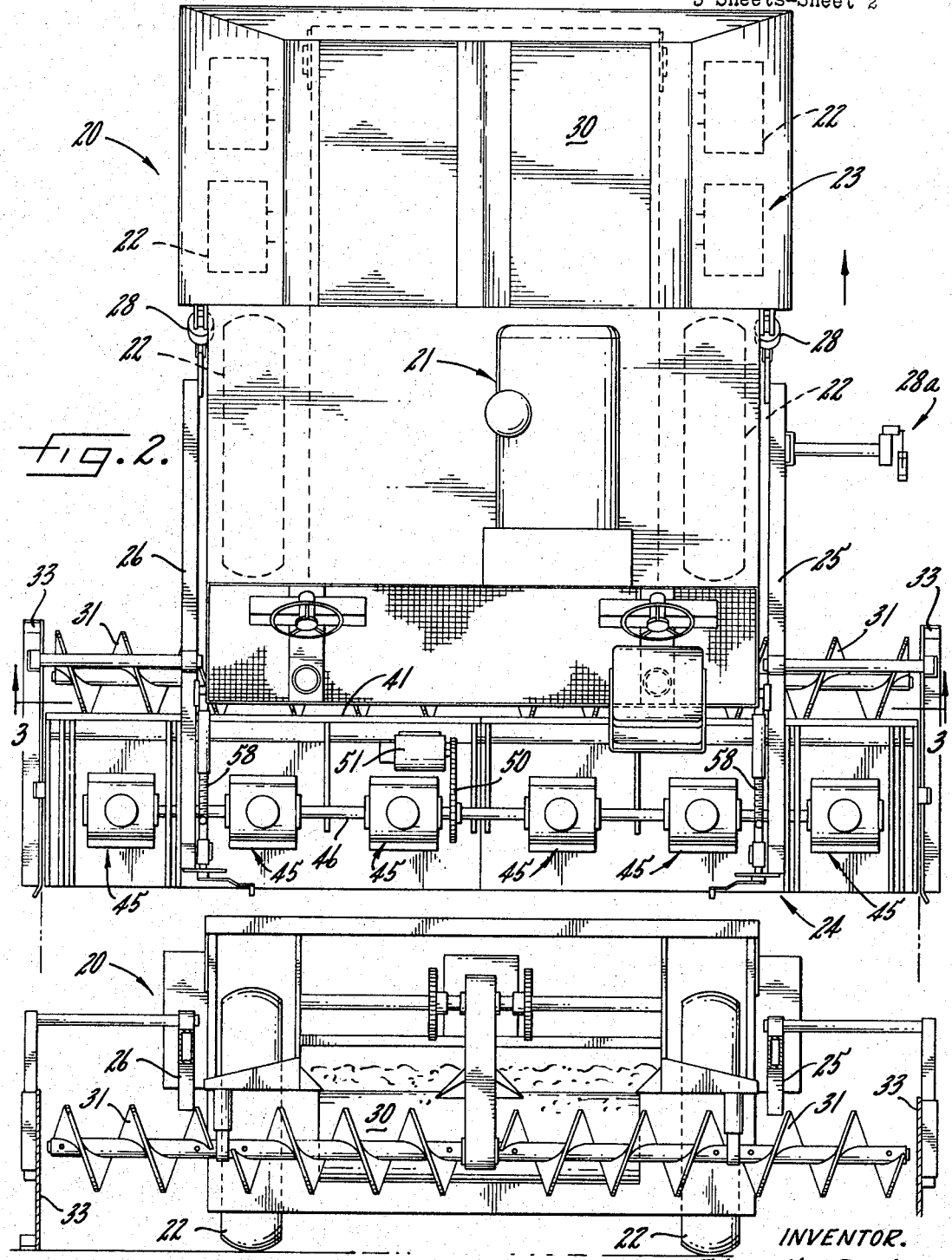

United States Patent Office 3,359,875
Patented Dec. 26, 1967

3,359,875
METHODS FOR LAYING SOIL CEMENT
John Henry Reider, 2325 N. Graham,
Indianapolis, Ind. 46218
Filed Apr. 9, 1965, Ser. No. 446,818
5 Claims. (Cl. 94—24)

The present application is directed to new and useful improvements in methods and apparatus for laying soil cement.

Soil cements have been known for a number of years. They consist of a simple, intimate mixture of pulverized soil and measured amounts of Portland cement and water, all compacted to an optimum density. When the cement hydrates, the mixture becomes a hard, durable paving material. The present invention is directed particularly to those types of soil cements which are compacted and which have sufficient cement to harden the soil and enough moisture for adequate compaction and hydration of the cement. Soil cements are used for their low cost and because they have greater load-carrying capacity than other low cost paving materials. Three basic materials are used in soil cement, namely: a soil that is oftentimes obtained from the area being paved, Portland cement and water. The term "soil" as used in soil cement means almost any combination of gravel, sand, silt and clay, and includes such materials as cinders, caliche, shale and chaff, as well as waste materials. The term "soil" refers to such materials as are commonly found in place in the road bed. The Portland cements used are the usual types of normal and air-entraining Portland cements. The water used can be almost any type of water and, in fact, sea water has been used satisfactorily in some cases. Generally speaking, the water should be relatively free from harmful amounts of alkalis, acids or organic matter. The best soil cements are usually obtained from sandy and gravelly soils with about 10 to 35 percent silt and clay combined, and the material should contain 55 percent or more material which will pass a No. 4 sieve. Generally speaking, soils with higher clay content and sandy soils which are deficient in fines, require larger amounts of cement in order to harden adequately.

In using soil cements heretofore, two basic methods have been employed which are commonly referred to as an in-place method and a plant-mix method. In both methods of preparing pavements with soil cements, the road bed or area being paved is shaped for crown and grade and the soil cement is thereafter laid in place. In the process of laying the soil cement in the in-place method, the soil of the road bed may be dup up and pulverized, and Portland cement is thereafter laid over the pulverized soil. Some mixing equipment is then used to form an intimate mixture of the soil and the cement. Thereafter a proper amount of water is applied to the mixture and the mixture is then compacted to an optimum density as by a vibrator or roller, followed by a finishing operation, which consists of a final shaping operation, usually through use of a road grader or the like. Thereafter, a coating of bituminous tar material is spread over the cement.

In the plant-mix method, the soil which is used in the soil cement is dug up from the road bed, or may be obtained from an adjacent area considered to have a better type of soil for the soil cement. The soil is then mixed with the cement in a mixng plant and a proper water content is added. This mixture of soil, cement and water is then delivered to the prepared road bed and spread over the prepared surface. This mixture is then compacted to optimum density followed by a finishing operation similar to the previously described.

In both types of methods used heretofore, separate equipment has been used to either lay or form the soil cement mixture and spread it into place, different equipment such as rolelrs or plate-type vibrators are utilized to compact the mixture to its optimum density, while still additional equipment is utilized, as for example through road graders, for finishing the surface. In both types of apparatus previously used, timing is considered critical. Generally speaking, the machines used to compact the mixture are required to perform their compacting operation within about 30 minutes after the mixture has been laid in place. These methods have the additional disadvantage that if rainfall occurs after the soil cement mixture is in place and before compaction takes place, serious damage may result. The problem of rainfall is sufficiently serious that these prior methods are not recommended if rain is likely to result between the steps of smoothing the prepared mixture of soil and cement and the step of compacting the mixture so laid. After compaction, the problem of rainfall is not so serious. Both of the prior methods discussed involve the use of a number of separate pieces of equipment for the aforesaid cement preparing, surface finishing, and compacting operations. The final shaping operation by a grader, usually leaves tire prints which must be removed by a light scarifying action.

With the foregoing in mind, the major purposes of the present invention are to create methods and apparatus for utilizing a plant-mix soil cement while using a single machine to deposit the prepared soil cement to its optimum density as it is being laid, the same machine imparting the final finishing operation to the surface of the laid soil cement. The use of the method and apparatus described in the specification hereafter eliminates the criticality of timing between the process of laying the mixture of soil and cement and the time of compaction, inasmuch as the mixture is compacted as it is being laid. The method and apparatus may automatically provide the correct depth, crown and grade of the surface being laid. At the time of laying, compaction and finishing occur simultaneously. The process and apparatus hereafter described may consistently lay a soil cement at its optimum density with relatively high compressive strengths. Higher paving speeds are possible at lower cost.

These and other purposes of the invention will become more apparent in the course of the ensuing specification and claims, when taken with the accompanying drawings, in which:

FIGURE 1 is a perspective view of a machine embodying the principles of the invention and utilized to perform the method of the invention;

FIGURE 2 is a plan view of certain soil cement depositing, compacting and finishing elements utilized in the present invention;

FIGURE 3 is a rear view of the machine of FIGURE 1 with certain portions removed so as to illustrate certain fundamental portions of the machine;

FIGURE 4 is an enlarged plan of a portion of the machine illustrated in FIGURE 2;

FIGURE 5 is an end view of the machine portion illustrated in FIGURES 2 and 4; and FIGURE 6 is a sectional view of the machine taken on section lines 6—6 of FIGURE 4.

Like elements are designated by like characters throughout the specification and drawings.

The term "soil cement" as used herein is intended to encompass soil cements as commonly known to the art. The term excludes watery and flowable mixtures such as concretes used in paving, bituminous paving materials, and cement grouts. Such soil cements at optimum moisture are neither mushy nor dry, but contain sufficient moisture to make a firm cast when it is squeezed in the hand. On the other hand, water cannot be squeezed out of the mixture and little moisture will appear on the hand.

Generally speaking, the amount of Portland cement in such soil cement mixtures will range from about 8 to 12 percent Portland cement by volume. The mixture is not fluid and usually contains about 10 to 12 percent moisture by weight.

With particular reference now to the drawings and in the first instance to FIGURE 1, the numeral 20 generally designates a self-propelled machine incorporating the principles of the present invention. The machine may have a suitable drive motor 21, and customary supporting and driving wheels 22. The front end of the machine includes an upwardly open hopper 23 for receiving a plant-mixed soil cement including soil, cement and moisture. Mounted on the rear of the machine is a screed generally designated at 24. Screed 24 is adapted to receive, deposit, compact, and finish the soil cement in a manner described more fully hereinafter. Screed 24 is carried by spaced and longitudinally extending arms 25 and 26 so that the level and grade may be controlled automatically. Arms 25 and 26 have depending extensions which are pivotally connected to the screed as at 27. Suitable hydraulic actuators 28 are adapted to move the forward portions of the arms upwardly and downwardly for proper positioning of the screed. Arms 25 and 26 have spaced rollers 29 at their forward ends, which rollers embrace beams 29a carried by the machine so that the screed 24 is carried by the machine as the machine moves forwardly. Automatic sensing devices 28a may be used to sense and control the elevation of the screed through means well known to the art. Support and control of screeds in this fashion for bituminous paving are known to that art.

As is seen more particularly in FIGURE 3, the machine includes a centrally disposed and longitudinally extending endless conveyor belt 30 which extends from the hopper 23 to the screed. Conveyor 30 is adapted to continuously deliver the soil cement mixture in the hopper to the screed. A distributing screw or auger 31 extends transversely of the rearward end of the conveyor 30 and is positioned to receive the soil cement from the conveyor 30 and distribute it over the width of the screed, taken transversely to the longitudinal axis of the machine and the movement of the machine. The amount of material within the screed may be controlled automatically by sensing devices known to the art so as to preclude crowding of the material within the screed, while insuring a full distribution of the soil cement within the screed.

Both the conveyor and auger are driven from the machine by suitable transmission means.

In accordance with the present invention, the screed generally designated at 24 includes a downwardly open structure the top of which is defined by a plate 32 which extends transversely of the machine. Plate 32 has a downwardly facing surface which is smooth and flat from the forward portion thereof to the rearward portion and from side to side thereof. The sides of the structure are defined by plate-like slip forms 33 which are carried at the sides of the plate 32 and in depending relation thereto. The slip forms extend at least to the rear of the plate 32 to thereby define, with the rear edge of plate 32 and the road bed, a rectangular opening. The slip forms at each side of the plate 32 are mounted for vertical adjustment as by means of a telescoping connection 34 on the plate-like slip form and a generally vertically extending bar 35 which is supported for rotation in a bearing 36 on each of the arms 25 and 26. Each slip form plate 33 carries an outwardly extended runner portion 37 which is adapted to ride and slide along the ground surface as the machine is in motion. The forward end of this portion 37 is turned upwardly as at 38. The rear end of the slip form plate 33 is bent outwardly from the rear edge of plate 32 at an angle 39 as is seen in FIGURES 1 and 4. Each of the slip form plates 33 at each side of the machine may be selectively raised and lowered by means of the screw actuators 40 which are connected by chains to the slip form plates and supported on the bar 35 as well as a supporting portion 40a of the screed. During the paving operation, the slip form plates are allowed to hang free of the chains so that they engage the ground surface.

The screed also includes an upwardly directed surface 41 at the forward edge of the plate 32. Surface 41 extends from one side of the screed to the other and is spaced from the auger 31 as appears in FIGURE 6. This upwardly directed surface 41 extends above the upper level of the distributing auger 31 and may be bent forwardly as shown so as to confine material and direct it downwardly with respect thereto.

The screed plate 32 is reinforced as by means of angle members 42 positioned on top thereof and an upper plate 43 which extends for the full width of the lower plate 32. A relatively sharp edge 44 is defined at the juncture of the lower portion of the distributing plate 41 and the forward edge of the plate 32. This sharp edge 44 serves to break up the uncompacted soil cement material for a better distributing action.

A plurality of vibrators generally designated at 45 are positioned on the upper plate 43. The vibrators 45 are positioned in spaced relation so as to impart generally uniform vibrations over the entire area of the plate members of the screed. As shown in the drawings, each vibrator is characterized by a rotating shaft 46 which carries a weight in the form of a disk 47. An adjustable weight 48 is screw-threaded into the disk 47 and is adjustable radially with respect to the axis of rotation thereof. Adjustment of the weight 48 inwardly and outwardly adjusts the amplitude of vibration of the vibrators 45. Access to the adjustable weight may be had through removable cover plates 49 on each of the vibrating units.

All of the vibrator disks are connected by the driving shaft 46 which may be driven as by means of a belt and pulley 50 which is coupled to a variable speed, rotary hydraulic motor 51 which is driven from the hydraulic system of the machine. The vibrators 45 have base portions 52 which are bolted to the upper plate 43. It is preferable to rotate the disks 47 in a counter-clockwise direction as appears in FIGURE 6 or counter-clockwise when the machine is viewed with the forward end on the right. Similar vibrators may be positioned on the plate for rotation about axes extending parallel to the longitudinal axis of the machine, and with the vibrators being driven from a common power shaft. The transverse disposition of the vibrating axis as shown in the drawings, along with the counter-clockwise rotation thereof, tends to oppose the direction of movement of the machine. This tends to hold the machine back and hold the screed over the soil cement mixture longer, all of which gives a better compaction of the soil cement mixture delivered to the space beneath the plate 32.

The upper plate of the screed may be composed of several sections positioned side by side and coupled together, as appears by the use of the sections 53, 54 and 55 in FIGURE 1. The width of the pavement may thus be selectively varied. Suitable longitudinal and transversely extending reinforcing members may be carried by the upper plate 43 and connected with the plate structure 41, as is represented by the members 56 and 57 in FIGURE 1.

The inclination of the downwardly facing plate 32 may be adjusted with relation to the supporting arms 25 and 26. Such adjustment may be made as by means of the extensible cranks 58 which are pivotally carried as at 59 on each arm 25 and 26 and having the other end thereof carried by upstanding supports 60 on the upper plate 43.

In use, the screed is made up to a desired width of pavement as, for example, 6, 8 or 10 feet or more by coupling screed sections together to make up this length. The rear edge of plate 32 is then adjusted as by means of actuator 58 to the desired height from the road bed surface. For example, if a 6-inch thickness of pavement is desired, the plate 32 is adjusted so that its rear edge is six inches from the road bed surface. At the same time the actuators 28 are set to provide a desired forward and upward inclination of the plate surface 32. An inclination which provides an 8-inch vertical space between the forward edge 44 of the plate and the road bed surface is generally satisfactory when the rear edge of plate 32 is positioned six inches from the road bed surface and the plate 32 has a width, taken forwardly and rearwardly of the machine of approximately two feet. The slip form plates 33 rock about the axis of the pivot bearing and descend so that the supporting runners 37 are in contact with the ground surface. The plates 33 are held snugly against the adjacent sides of the plate structure 32.

A mixture of soil cement which may consist of flume sand as the principal soil ingredient, approximately 10 percent Portland cement by volume, and with an optimum moisture content of approximately 10 to 12 percent by weight is then delivered to hopper 23. This water content is insufficient to create any "slump" of the mix. The paving operation may then commence. This mix is delivered by the conveyor 30 to the distributing space around the auger 31. Auger 31 distributes the material through the full width of this space in front of the screed. When the level of uncompacted material is at the level of the auger shaft the machine may commence its forward movement while the mix material is continuously delivered to the auger space. The rate of delivery, in conjunction with the speed of forward movement of the machine, should be such that a level of uncompacted material is maintained at or near the axis of the auger and preferably higher.

As the machine moves forward, the uncompacted material enters the vibrating space which is confined by the plate 32, the slip form plates and the road bed surface. As the machine continues its movement, the material is gradually compacted by the action of the vibrators to optimum density and the compacted paving material is more or less extruded through the generally rectangular opening defined by the rear end of the plate 32, the rear ends of the slip form plates 33 and the road bed surface. The screed plate and slip form plates together with the road bed surface define, in effect, an extrusion mold to which the material is delivered for compaction to optimum density.

When starting the machine, the adjustable weights 48 may be positioned to give a desired amplitude of vertical vibrations while the speed of motor 51 is adjusted to a desired frequency of vibration which may, for example, be on the order of 4,000 cycles per minute. After a small amount of pavement has been laid, it may be checked for compaction to optimum density. Generally speaking, if the frequency and amplitude selected have resulted in a compaction to 95 percent of optimum density or more, the frequency and amplitude are proper. On the other hand, if compaction is insufficient, then the frequency and/or weights 48 may be adjusted and another small amount of pavement laid followed by a further checking of the density. When the frequency and amplitude selected results in 95 percent or more of the optimum density, the machine is ready for the complete paving operation. The machine may then move continuously forwardly to continuously lay, compact and finish a strip of pavement.

As the machine moves forwardly, soil cement mix is delivered to the hopper (as by dump trucks) so that mix is continuously ready in the auger space.

In connection with the adjustment of the frequency and adjustment of the amplitude of vibrations, it has been found that the frequency and amplitude necessary for compaction to optimum density will vary somewhat from one type of soil to the next. Generally speaking, frequencies in the range of 3500 to 4500 cycles per minute with vibrators of the type shown and described herein are sufficient, although one particular frequency in this range will be best for one material, while another frequency may be best for another material.

The weight of the screed assembly, which is transmitted through plate 32 to the soil cement mix beneath plate 32, when taken with the compacting energy delivered by the vibrators must be such, when taken with the rate of forward travel, as to compact to approximately optimum density.

The vibration so imparted vibrates the entire front to rear surface of the smooth finished plate 32, as well as the slip form plates 33 and the material confining plate 41.

The machine may be used to lay a strip of pavement adjoining a previously laid strip as is indicated by the previously laid strip 62 in FIGURE 1. In this event, the slip form adjacent the previously laid strip is held in the elevated position and the confining action at that side of the screed is maintained by the vertical surface or edge of the previously laid strip of pavement.

The action of the vibrators also improves the distributing action of the transversely extending distributing plate 41, in that vibrations imparted to this plate tend to shake and distribute the material well for its delivery to the space beneath the plate 32.

Good results have been obtained with a soil consisting chiefly of flume sand. Pea gravel can be utilized in place of the flume sand as long as sufficient fines or sands are present in the mix.

After the pavement is laid, it may be given a surface coating of bitumen. Tar is a satisfactory finish.

Compressive strengths of 1000 p.s.i. to approximately 3000 p.s.i. may be obtained, depending upon the cement content of the mix. More cement content generally results in greater compressive strength.

It should be understood that self-propelled machines of the type represented by the tractor, hopper 23 conveyor 30 and auger 31 are known and have been used in conjunction with supporting arms as generally represented at 25 and 26 for depositing asphalt through screeds of a type different in structure and operation from the screed disclosed and illustrated herein. The driving machine, conveying system, and controls for the supporting arms, in and of themselves, are not the invention claimed herein except in so far as they co-operate with the screed structure disclosed herein to perform the method described herein and obtain the results and advantages of the present invention.

Whereas I have shown and described a certain operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should, therefore, be limited only by the scope of the hereinafter appended claims.

I claim:

1. The method of laying a roadway of cement and aggregate to a finished density, thickness and grade which comprises the steps of uniformly conveying
    a premixed mixture of aggregate in the form of a soil of a type equivalent to that commonly found in place in a roadway and containing some relatively fine granular material,
    Portland cement by volume constituting a minor proportion of said mix but sufficient to harden the soil to a hard, durable paving material after hydration of the cement,
    and water to provide substantially optimum moisture content of the mix and sufficient to cause hydration of the cement but with the mix having substantially no slump characteristic,
into an extrusion mold of predetermined volume defined by a downwardly and rearwardly sloping adjustable screed plate spaced above the road bed and provided with slip form plates at the sides of said screed plate and which ride upon the ground surface, and vibrating said screed plate uniformly along its length whereby the mixture in said mold space is vibrated and compressed as said mold moves forwardly, with amplitudes and frequencies to provide vibrational energy imparted to the mixture such that, when taken with the inclination of the screed plate, the mixture is compacted to optimum density of about 95% as the mold passes over the mixture.

2. The method of claim 1 wherein the major ingredient in the aggregate is the equivalent of flume sand.

3. The method of claim 1 characterized by and including the step of laying a short length of said cement by the steps recited, testing the short length for density, and then adjusting the energy of said vibrations to cause better compaction and optimum density during subsequent laying and compaction of the mixture.

4. The method of claim 1 wherein said soil includes pea gravel.

5. The method of claim 1 wherein said vibrating means are provided by a plurality of variable amplitude and frequency vibrators and are driven at about 3500 to 4500 cycles per minute.

References Cited

UNITED STATES PATENTS

| | | | |
|---|---|---|---|
| 2,090,959 | 8/1937 | Jackson | 94—46 |
| 2,180,198 | 11/1939 | Day | 94—46 |
| 2,589,257 | 3/1952 | Horning | 94—46 |
| 2,757,588 | 8/1956 | Pollitz | 94—46 X |
| 2,951,426 | 9/1960 | Pollitz | 94—46 |
| 3,155,021 | 11/1964 | Sauer et al. | 94—45 |
| 3,236,163 | 2/1966 | Ackerman et al. | 94—46 |

JACOB L. NACKENOFF, *Primary Examiner.*